April 18, 1967     E. R. ZIEGLER     3,314,308

ACCESSORY DRIVE MECHANISM

Filed Sept. 28, 1964

INVENTOR.
Eugene R. Ziegler
BY
Robert L. Spencer
ATTORNEY

United States Patent Office 3,314,308
Patented Apr. 18, 1967

3,314,308
ACCESSORY DRIVE MECHANISM
Eugene R. Ziegler, Spencerport, N.Y., assignor to General Motors Corporation, Detroit, Mich., a corporation of Delaware
Filed Sept. 28, 1964, Ser. No. 399,529
8 Claims. (Cl. 74—752)

This invention relates to accessory drives and in particular to a multiple speed transmission and control mechanism for driving power driven accessories in an automotive vehicle. The invention is particularly adapted for driving an automobile engine cooling fan but may be applied to other engine driven accessories such as, for example, a generator or alternator, an air compressor, a refrigerant compressor for an air conditioning system, or a power steering pump. Automotive accessories have commonly been belt driven at a constant ratio with respect to engine speed. At relatively low engine speeds such as idle, the power output of the accessories is often insufficient to satisfy the requirements of the accessories driven or supplied by the accessories. As a particular example, the fan speed at engine idle is often insufficient to provide adequate engine cooling. Likewise, the refrigerant compressor, power steering pump and generator do not satisfy the vehicle requirements at engine idle speed.

An object of this invention is to provide a planetary gearing unit and control automatically operable at engine idle speed to drive an engine driven accessory at overdrive speed ratio at engine idle speed.

Another object of this invention is to provide an engine accessory drive incorporating an engine driven governor for controlling the drive ratio at which the accessories are driven.

A further object of this invention is to provide a two-speed planetary gearing unit for driving engine driven accessories incorporating a one-way clutch and a brake adapted to be alternately engaged and released to establish a change of drive ratio together with an engine driven governor for controlling the drive ratio at which the accessories are driven.

A more particular object of this invention is to provide means for controlling engagement and release of a brake including a governor controlled clutch effective when engaged to transmit torque to the brake to establish overdrive of the accessories.

An additional object of this invention is to provide in an accessory drive of the type described and having an alternately engageable and releasable brake and clutch for establishing change of drive ratio, an engageable and releasable clutch for controlling engagement and release of said brake and an engine speed responsive governor for controlling said clutch wherein the governor is effective at engine speeds below a predetermined speed to engage one of said clutches and said brake and effective at speeds above said predetermined speed to release said one clutch and brake to permit the other of said clutches to engage.

A further object of this invention is to provide a two-speed accessory drive including a planetary gearing system including an engageable and releasable brake band effective when engaged to establish overdrive of the accessories and a one-way clutch effective when engaged to establish direct drive of the accessories together with a control clutch effective when engaged to transmit torque to the band to engage the band, and to provide an engine driven governor effective at engine speeds below a predetermined speed to engage said control clutch and effective at engine speeds above a predetermined speed to release said control clutch, said one-way clutch being automatically released upon engagement of said brake band and automatically engaged upon release of said brake band.

These and other objects and advantages of this invention will be apparent from the following description and claims taken in conjunction with the accompanying drawings, in which:

Figure 1:
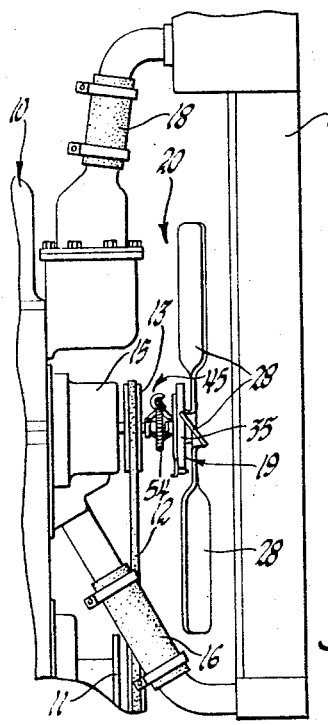
FIGURE 1 is an elevational view of the accessory drive employed to drive a fan with a schematic showing of the vehicle engine and radiator together with the belt drive for driving two-speed accessory transmission.

Referring to FIGURE 1, there is shown a variable speed fan drive constructed in accordance with the principles of this invention. An engine 10 drives a pulley 11 at engine speed. A second pulley 13 driven by a belt 12 drives a shaft 14 in response to rotation of pulley 11. Pulley 13 drives a shaft 14 best shown in FIGURE 2 rotatably supported in a water pump housing 15. Shaft 14 may drive a water pump (not shown) for circulating water through a radiator inlet hose 16, a radiator 17 and a water return hose 18. Shaft 14, which is driven at a fixed ratio with respect to engine speed, also constitutes a power input shaft for a gear unit indicated generally at 19 for driving a cooling fan indicated generally at 20.

Figure 2:
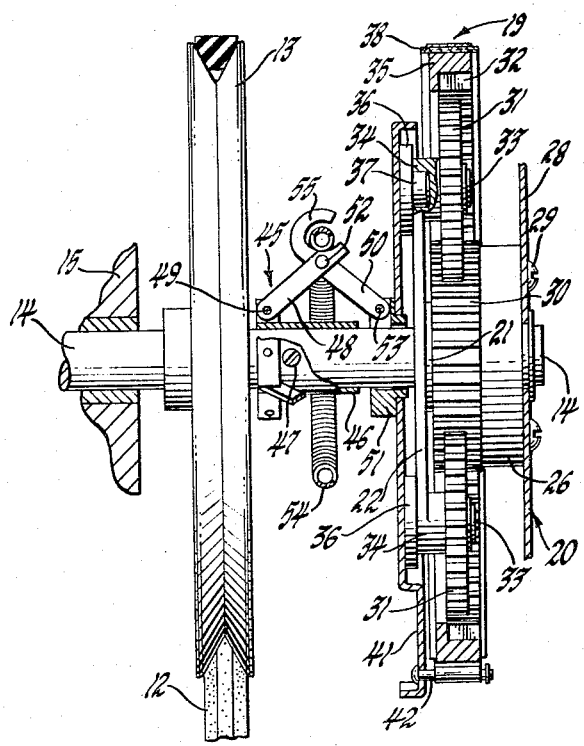
FIGURE 2 is a longitudinal sectional view of the accessory transmission and illustrates the governor and clutch controlled by the governor.
Figure 3:
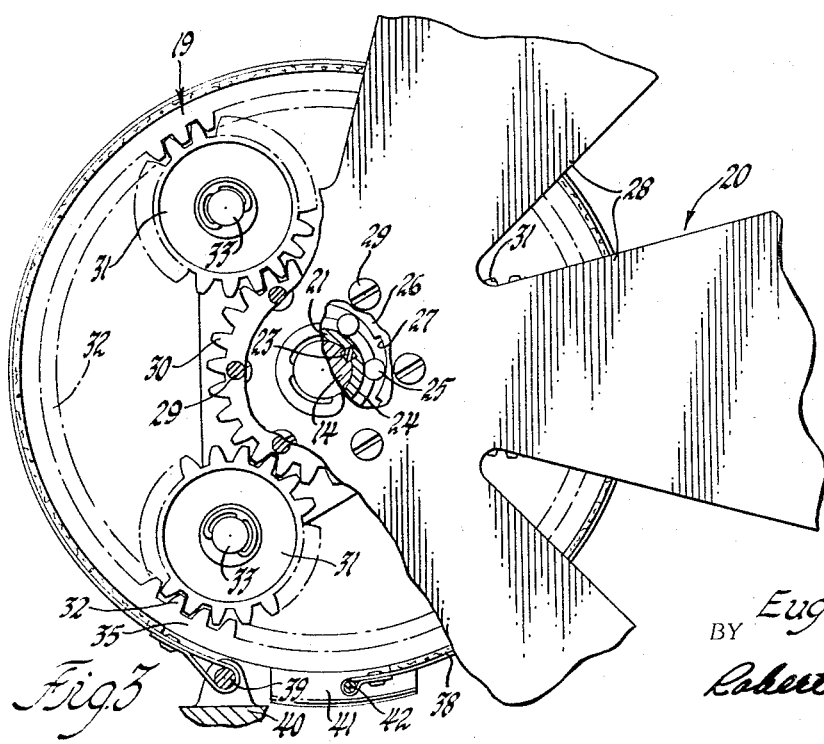
FIGURE 3 is an end view of the transmission with parts broken away to illustrate the one-way clutch and its relationship to the planet carrier hub and power delivery hub.

Referring to FIGURES 2 and 3, shaft 14 extends through and is keyed to an axially extending annular boss or hub 21 of a planet carrier 22 such that the carrier is supported upon and driven by shaft 14. A key 23, best shown in FIGURE 3, connects carrier hub 21 to shaft 14 for rotation therewith. Carrier hub 21 presents an annular cylindrical surface 24 for receiving a plurality of rollers 25. A fan hub 26 is supported upon carrier hub 21 by means of rollers 25 and is provided with cam surfaces 27 for cooperating with rollers 25. The rollers 25 cooperate with cam surfaces 27 to provide an overrunning clutch between carrier hub 21 and fan hub 26. Fan blades 28 are secured to fan hub 26 for rotation therewith by bolts 29. A sun gear 30 is formed on fan hub 26 for rotation therewith.

Planet carrier 22 supports a plurality of planet pinions 31 (preferably three in number) on planet pins 33, each pin extending axially from a boss 34. Planet pinions 31 mesh with sun gear 30 on fan hub 26 and with a ring gear 32 formed on a drum 35. Each boss 34 in planet carrier 22 supports a friction pad 36, the pad 36 having a base 37 extending into the boss such that the pads rotate with the carrier as shown in FIGURE 2. A brake band 38 extending around drum 35 has one end fixed to a ground member 40 by a pin 39 and the other end connected to a clutch plate 41 by a pin 42.

A governor indicated generally at 45 controls engagement and release of clutch disc 41 to and from friction pads 36. A sleeve 46 fixed to shaft 14 for rotation therewith by an anchor screw 47 drives a governor link 48 pivotally connected to sleeve 46 by a pin 49. A second link 50 is pivoted to link 48 and to a boss 51 on clutch plate 41 by pins 52 and 53, respectively. A garter spring 54 extends around the links 48-50 to urge clutch disc 41 towards engagement with friction pads 36. A retaining hook 55 is provided on link 50 to contain garter spring 54 at high speeds of rotation. Anchor screw 47 provides an adjustable means whereby the axial position of sleeve 46 may be adjusted or varied to calibrate the governor action. While only one set of links 48, 50 and one hook 55 are shown, it will readily be understood that a plurality of sets of links, preferably three in number, will be provided. Since the three sets of links and hooks are of similar structure, only one has been shown and described.

In operation, assuming clockwise rotation of shaft 14 in FIGURE 3, garter spring 54 yieldably biases link 50 to move boss 51 and clutch plate 41 axially toward friction pads 36. Sleeve 46 driven by shaft 14 and link 48 absorbs the reaction. While only one friction pad 36 is shown, it will be understood that a plurality, preferably three, of such pads will be carried by planet carrier 22. With the engine idling or with the engine operating below a predetermined engine speed, spring 54 will be effective to force clutch disc 41 into friction contact with friction pads 36. Since pads 36 in carrier 22 are rotating at engine speed, the friction contact of clutch disc 41 with the pads will transmit a torque to clutch disc 41 tending to rotate the disc, thereby applying a torque to pin 42 to engage brake band to drum 35. With drum 35 held against rotation by brake 38, ring gear 32 is held against rotation and constitutes a reaction member for the planetary gearing unit. Since carrier hub 21 is keyed to input shaft 14 by key 23, the carrier 22 rotates at the speed of rotation of input shaft 14. With ring gear 32 held against rotation, planet pinions 31 will walk around ring gear 32 and revolve about shafts 33 to drive sun gear 30, fan hub 26, and fan blades 28 at overdrive with respect to the speed of rotation of input shaft 14. The overdrive ratio is the ratio of the number of teeth on ring gear 32 to the number of teeth on sun gear 30. In the present embodiment, overdrive ratio is two and one-half to one.

Assuming that the vehicle is accelerated, links 48 and 50 of governor 45 will at some speed, force governor spring 54 to expand such that hub 51 will move axially away from the gearing assembly to release clutch disc 41 from friction contact with friction pads 36. Brake band 38 will release from drum 35 and ring gear 32 to rotate. With brake 38 released, carrier 22 rotates as the speed of rotation of input shaft 14 and drives pinions 31. Upon relative rotation of carrier hub 21 and fan hub 26, one-way clutch rollers 25 lock fan hub 26 to carrier hub 21 for direct drive of fan hub 26 such that fan blades 28 rotate at the speed of rotation of input shaft 14. The one-way clutch provides for smooth transition of drive ratio, particularly upon a shift from overdrive to direct drive. As the brake band is being released from drum 35 there will be a gradual slowing down of fan hub 26 relative to speed of rotation of shaft 14 and carrier hub 21. As the fan hub tends to rotate more slowly than the carrier hub, the one-way clutch locks up. Since the two hubs are rotating at substantially the same speed at the moment lock up occurs, the one-way clutch engages without jar or large torque reaction. It will readily be understood that the one-way clutch will automatically release to permit fan hub 26 to over-speed carrier hub 21 upon application of brake band 38 to drum 35.

Adjusting screw 47 permits sleeve 46 to be moved axially relative to shaft 14 to calibrate the speed at which the transition from overdrive to direct drive will occur. It is contemplated that at engine idling speed, garter spring 54 will be effective to establish friction contact of clutch disc 41 and friction pads 36 on carrier 22. At engine speeds above idle, clutch disc 41 will be released or direct drive operation.

It will be apparent that the design is of simple, compact construction adapted for use in vehicles already in use as well as in original production. The arrangement of clutch disc 41 for actuating brake band 38 and the one-way clutch between the carrier hub 21 and fan or power delivery hub 26 together with governor 45 is believed novel.

What is claimed is:

1. In an accessory driving mechanism adapted to be driven by an engine, the combination of an engine driven power input shaft, an output member connected to said accessory for driving the same, a power transmission device for driving said output member, said device including a planet carrier driven by said input shaft and supporting a planet pinion in mesh with a ring gear and a sun gear, means for establishing direct drive including a one-way clutch having one race driven by said input shaft and a second race rotatable with said output member, an engageable and releasable brake effective when engaged to prevent rotation of said ring gear, means for applying said brake including an engageable and releasable clutch effective when engaged to transmit torque to said brake to engage said brake, and speed responsive means for controlling engagement and release of said clutch.

2. In an accessory driving mechanism, the combination of an engine driven power input shaft, a power output member connected to said accessory for driving the same, a sun gear rotatable as a unit with said power output member, a ring gear, a planet carrier driven by said input shaft and supporting a planet pinion gear in mesh with said sun gear and said ring gear, an engageable and releasable brake effective when engaged to prevent rotation of said ring gear, means for driving said power output member in direct drive when said brake is released including an engageable and releasable control clutch operatively connected to said brake and effective when engaged to transmit torque from said carrier to said brake to engage said brake, and speed-responsive means for controlling engagement and release of said control clutch.

3. In an accessory drive mechanism adapted to be driven by an engine, an engine driven power input shaft, an output member connected to said accessory for driving the same, power transmitting means for driving said output member, said power transmitting means including a planet carrier supporting a planet pinion in mesh with a ring gear and a sun gear, said carrier being driven by said input shaft, means for driving said output member at a first drive ratio with respect to the speed of rotation of said input shaft including a one-way clutch, an engageable and releasable brake effective when engaged to brake said ring gear against rotation, said power transmitting means being effective when said brake is engaged to drive said power output member at overdrive speed with respect to the speed of rotation of said input shaft, said one-way clutch being engaged when said brake is released and released when said brake is engaged, a brake control clutch connected to said brake and adapted to engage said planet carrier to apply said brake, and a clutch control governor driven by said input shaft for controlling engagement and release of said brake control clutch.

4. A two-speed accessory drive for driving the accessories of an engine driven vehicle comprising an engine driven power input shaft, a planet carrier driven by said power input shaft, a drum, a ring gear fixed to said drum for rotation therewith, a power delivery sun gear, planet pinions on said carrier in mesh with said ring gear and sun gear, a one-way clutch effective when engaged to clutch said carrier to said sun gear to establish direct drive, an engageable and releasable brake effective when engaged to brake said ring gear against rotation, an engageable and releasable clutch effective when engaged to transmit torque from said carrier to said brake to engage said brake, and speed responsive means for controlling engagement and release of said last-mentioned clutch, said accessories being connected to and driven by said sun gear.

5. A two-speed accessory drive for driving the accessories of an engine driven vehicle comprising an engine driven power input shaft, a planet carrier driven by said shaft, a sun gear, a ring gear, planet pinions on said carrier in mesh with said sun and ring gears, a sun gear hub and a planet carrier hub disposed in concentric relationship and spaced from each other, a one-way clutch effective when engaged to clutch said hubs to each other, an engageable and releasable brake effective when engaged to brake said ring gear against rotation, said one-way clutch being alternately engaged and released, an axially movable clutch member connected to said brake, governor means driven by said input shaft for controlling the axial position of said clutch member, said governor means including a spring effective at speeds of rotation of said input shaft below a predetermined speed of rotation to position said clutch member in contact with said carrier to apply said brake, said governor means including speed responsive means effective at speeds of rotation of said input shaft above said predetermined speed to release said clutch member from said carrier to thereby release said brake, said accessories being operably connected to said sun gear hub and driven thereby.

6. In an accessory drive mechanism adapted to be driven by an engine, an engine driven power input shaft, a sun gear, a power delivery sun gear hub connected to said accessories for driving the same, a planet carrier driven by said input shaft, a planet carrier hub disposed in concentric relationship with respect to said sun gear hub, a one-way clutch disposed in the space between said hubs effective when engaged to establish direct drive between said carrier and sun gear, a ring gear, planet gears driven by said carrier in mesh with said sun and ring gears, an engageable and releasable brake effective when engaged to establish overdrive of said sun gear, a clutch member connected to said brake, means for urging said clutch member into contact with said carrier, said clutch member being effective when contacting said carrier to transmit torque from said carrier to said brake to engage said brake, and speed responsive means responsive to a predetermined speed of rotation to move said clutch member to a release position spaced from said carrier to release said brake, said one-way clutch being automatically operable upon release of said brake to clutch said hubs to each other to establish direct drive of said sun gear hub and the accessories driven thereby.

7. In an accessory drive mechanism adapted to be driven by an engine, an engine driven power input shaft, a planet carrier driven by said power input shaft and supporting a planet pinion gear in mesh with a ring gear and a sun gear, a power output member driven by said sun gear and connected to said accessory for driving the same, a hub member driven by said carrier and disposed in concentric relationship with respect to said output member, a one-way clutch disposed beween said members effective when engaged to lock said members to each other to establish direct drive of said accessories, an engageable and releasable brake effective when engaged to brake said ring gear against rotation to thereby establish overdrive of said accessories, an axially movable clutch member operably connected to said brake, means for disposing said clutch member in contact with said carrier, said clutch member being effective upon contact with said carrier to transmit torque from said carrier to said brake to engage the same, and speed responsive means responsive to a predetermined speed of rotation of said input shaft to release said clutch member from said carrier, said one-way clutch being engaged when said brake is released and said one-way clutch being released when said clutch is engaged.

8. A two-speed accessory drive for driving an accessory of an engine driven vehicle comprising an engine driven power input shaft, a planet carrier driven by said power input shaft, a reaction ring gear, a power delivery sun gear connected to said accessory for driving the same, planet pinions supported on said carrier in mesh with said sun and rings gears, a one-way clutch for clutching said carrier to said sun gear to establish direct drive of said sun gear, an engageable and releasable brake effective when engaged to prevent rotation of said ring gear to establish overdrive of said sun gear, said one-way clutch being engaged when said brake is released and released when said brake is engaged, a clutch member connected to said brake member and axially movable from an engaged position in contact with said carrier to a released position spaced from said carrier, said clutch member in its engaged position being effective to engage said brake and in its released position being effective to release said brake, a governor driven by said input shaft for controlling said clutch member, said governor including a drive link driven by said input shaft and in pivotal relationship with respect to said shaft, a hub member supporting said axially movable clutch member, a second link pivotally connected to said drive link and to said hub member, spring means yieldably biasing said links to position said clutch member in contact with said carrier, said links being movable in response to a predetermined speed of rotation of said input shaft to move said hub member axially to release said clutch member from said carrier.

References Cited by the Examiner
UNITED STATES PATENTS

| | | | |
|---|---|---|---|
| 1,928,630 | 10/1933 | Penrose | 188—140 |
| 1,949,203 | 2/1934 | Havill | 74—752 |
| 2,188,766 | 1/1940 | Buckley | 188—137 X |
| 2,189,220 | 2/1940 | Osborne | 74—752 |
| 2,410,921 | 11/1946 | Avila | 74—785 X |
| 2,889,719 | 6/1959 | Honich | 74—752 |
| 2,901,924 | 9/1959 | Banker | 74—752 |

DAVID J. WILLIAMOWSKY, *Primary Examiner.*

J. R. BENEFIEL, *Assistant Examiner.*